(12) United States Patent
Carl et al.

(10) Patent No.: US 9,981,202 B2
(45) Date of Patent: May 29, 2018

(54) ROTARY EVAPORATOR WITH MECHANICAL FOAM BREAKER

(71) Applicant: HANS HEIDOLPH GMBH, Kelheim (DE)

(72) Inventors: Joachim Carl, Stein (DE); Patrick Nico Jost, Steinheim am Albuch (DE)

(73) Assignee: HANS HEIDOLPH GMBH, Kelheim (DE)

( * ) Notice: Subject to any disclaimer, the term of this patent is extended or adjusted under 35 U.S.C. 154(b) by 380 days.

(21) Appl. No.: 14/774,965

(22) PCT Filed: Mar. 7, 2014

(86) PCT No.: PCT/EP2014/054413
§ 371 (c)(1),
(2) Date: Dec. 10, 2015

(87) PCT Pub. No.: WO2014/139866
PCT Pub. Date: Sep. 18, 2014

(65) Prior Publication Data
US 2016/0136539 A1    May 19, 2016

(30) Foreign Application Priority Data
Mar. 14, 2013   (DE) .................. 10 2013 204 459

(51) Int. Cl.
*B01D 3/08* (2006.01)
*B01D 1/02* (2006.01)
(Continued)

(52) U.S. Cl.
CPC ............... *B01D 3/085* (2013.01); *B01B 1/02* (2013.01); *B01D 1/222* (2013.01); *B01D 1/223* (2013.01); *B01D 3/02* (2013.01); *B01D 19/02* (2013.01)

(58) Field of Classification Search
CPC .......... B01B 1/02; B01D 19/02; B01D 1/222; B01D 1/223; B01D 3/02; B01D 3/085
See application file for complete search history.

(56) References Cited

U.S. PATENT DOCUMENTS 3,252,502 A    5/1966   Eckardt et al.
4,508,546 A    4/1985   Zlokarnik
(Continued)

FOREIGN PATENT DOCUMENTS

DE    1519556 A    3/1970
DE    109154 A3    10/1974
(Continued)

OTHER PUBLICATIONS

International Preliminary Report on Patentability from International Patent Application No. PCT/EP2014/054413, prepared Jul. 15, 2015.

*Primary Examiner* — Renee Robinson
*Assistant Examiner* — Derek N Mueller
(74) *Attorney, Agent, or Firm* — Wiggin and Dana LLP; Gregory S. Rosenblatt; Matthew I. Burton

(57) ABSTRACT

A rotary evaporator for the vacuum distillation of a liquid is disclosed. The rotary evaporator contains an evaporator flask and a vapor feeder with an interior volume connected downstream of the evaporator flask. The rotary evaporator further contains a rotor that has a mechanical foam breaker within the interior volume of the vapor feeder. Further, a cooler is connected downstream of the vapor feeder.

15 Claims, 4 Drawing Sheets

Figure 1:
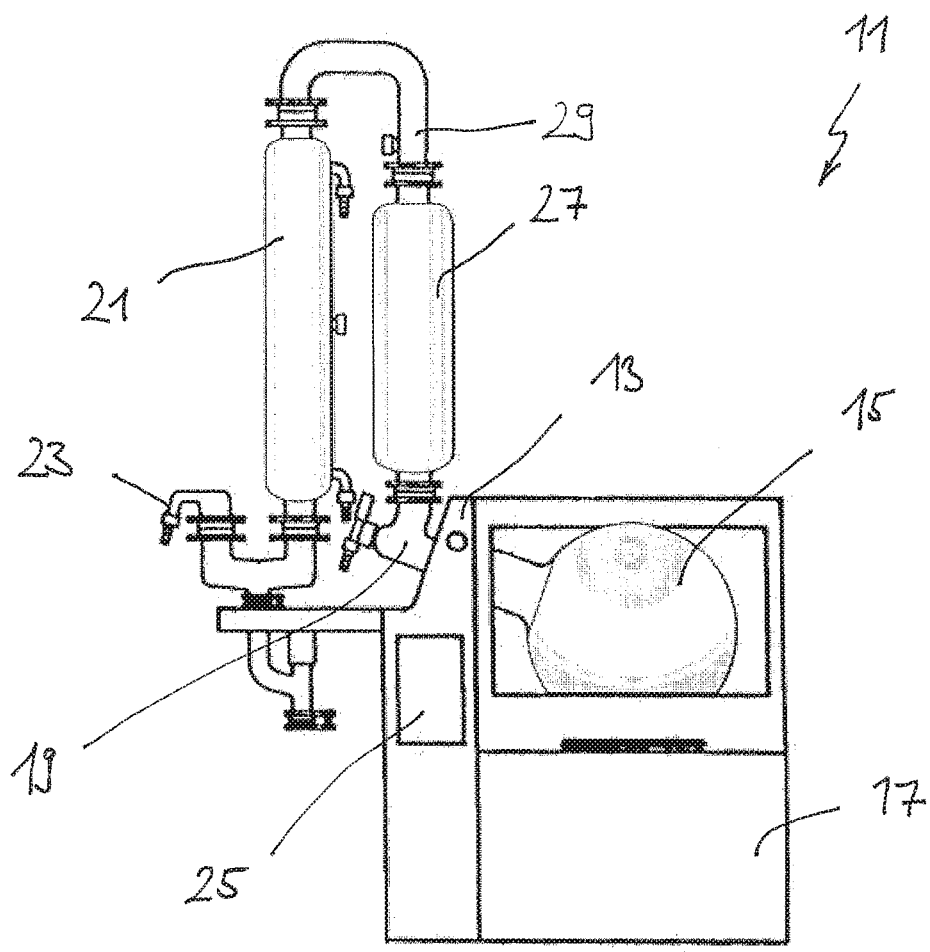

(51) Int. Cl.
 *B01B 1/02* (2006.01)
 *B01D 1/22* (2006.01)
 *B01D 3/02* (2006.01)
 *B01D 19/02* (2006.01)

(56) References Cited

U.S. PATENT DOCUMENTS

| | | | |
|---|---|---|---|
| 4,759,825 A * | 7/1988 | Medvey | B01D 3/085 |
| | | | 137/386 |
| 4,790,911 A | 12/1988 | Parkinson | |
| 5,536,374 A | 7/1996 | Spring | |
| 2003/0000651 A1 | 1/2003 | Genser | |
| 2003/0111185 A1 | 6/2003 | Genser | |
| 2011/0100561 A1 | 5/2011 | Alasti et al. | |

FOREIGN PATENT DOCUMENTS

| | | |
|---|---|---|
| DE | 256829 A1 | 12/1986 |
| DE | 10114434 A1 | 10/2002 |
| DE | 10226478 A1 | 4/2003 |
| EP | 0035705 B1 | 5/1984 |
| EP | 0665765 A1 | 8/1995 |
| GB | 773742 A | 5/1957 |
| GB | 1039709 A | 8/1966 |
| WO | 94/07589 A1 | 4/1994 |

* cited by examiner

ROTARY EVAPORATOR WITH MECHANICAL FOAM BREAKER

The present invention relates to a rotary evaporator for the vacuum distillation of a liquid having an evaporator flask and a cooler which is connected downstream of the evaporator flask and which is connected thereto via a vapor feeder.

A rotary evaporator is a laboratory apparatus which comprises a heating bath and an evaporator flask which can dip into the heating bath. In operation, a liquid medium present in the heating bath, for example water or—for higher temperatures—oil, is heated in order thus to heat the evaporator flask dipped into the heating bath. A liquid, in particular a liquid mixture, contained in the evaporator flask can hereby be heated so that the respective distillate, in particular a solvent, is evaporated. The evaporated distillate then flows via a vapor feeder, in particular via one or more glass components, into a cooler of the rotary evaporator to condense there. The condensate is subsequently collected in a collection flask. A rotary evaporator furthermore comprises a rotary drive for the rotation of the evaporator flask in the heating bath. The evaporator flask is uniformly heated due to the rotation and a thin liquid film which has a large surface and from which the distillate can be evaporated fast and efficiently is produced at the heated inner wall of the evaporator flask. The distillation residue remaining in the evaporator flask can be further processed or analyzed.

It is known for distillations of splashing and foaming liquids to connect an expansion vessel between the evaporator flask and the cooler. It can nevertheless occur under certain circumstances that foam which is created fills the expansion vessel completely and there is a risk that the foam enters into the cooler and from there into the distillate. To prevent this, the distillation process must therefore be aborted or at least interrupted in good time beforehand.

It is the underlying object of the invention to provide a rotary evaporator of the initially named kind with which an aborting or interruption of the distillation process is no longer required even with highly foaming liquids.

This object is satisfied by a rotary evaporator having the features of claim 1 and in particular in that a rotor having a mechanical foam breaker is provided in the interior of the vapor feeder.

In accordance with the invention, foam rising in the interior of the vapor feeder can be mechanically broken by a rotation of the foam breaker. High forces act on the foam via the rotating foam breakers and result in an increase in the density of the foam. The volume of the foam is hereby reduced and the foam simultaneously becomes flowable so that it can flow back out of the vapor feeder into the evaporator flask. It is ultimately hereby achieved that the foam does not rise beyond the vertical level at which the foam breaker is located in the vapor feeder.

The rotor is preferably configured to be driven contactlessly, in particular electromagnetically, by a drive device, in particular a stator, arranged outside of the vapor feeder. The drive can alternatively also comprise a battery, in particular a rechargeable battery, formed integrally with the rotor. The battery can be contactlessly rechargeable, for example inductively, capacitively, electromagnetically or optically. The rotor is therefore preferably not driven by a drive device in mechanical contact with the rotor and arranged outside of the vapor feeder, with this, however, generally also being possible. A drive shaft is then e.g. led through the wall of the vapor feeder. In this case, the passage has to be sealed by the vapor feeder.

The stator preferably comprises a plurality of coils which are arranged, in particular evenly distributed, in the peripheral direction and which are controlled such that a magnetic rotating field or a rotating magnetic field is generated. The rotated outer magnetic field then draws the rotor along. The stator can have a plurality of magnetic poles, for example 2, 3, 4, 5, etc., arranged in particular evenly distributed, in the peripheral direction.

The rotor can comprise an even number of permanent magnet poles, i.e. 2, 4, 5, 8, etc. permanent magnet poles, arranged, in particular evenly distributed, in the peripheral direction. The rotor and the stator then form a permanent magnet motor. A direct magnetic action of force arises between the rotor and the stator. The permanent magnet poles, in particular a permanent magnet, can be encapsulated in a chemically resistant plastic. The permanent magnet poles can be configured as a magnetic entrainer which is fixedly, in particular rotationally fixedly, connected to the foam breaker.

The rotor can alternatively comprise a short circuit ring or an electrically conductive ring. The rotor and the stator then form a squirrel-cage motor. A rotating outer magnetic field generated by the stator induces a voltage in the short-circuit ring which has the consequence of eddy currents in the interior of the short-circuit ring which lead to a magnetic field of the rotor which follows the rotating stator field. A further, concentrically arranged ring of ferroelectric material can be provided in the interior of the ring to increase the magnetic flux.

The stator can comprise a plurality of coils which are arranged, in particular evenly distributed, in the peripheral direction and whose coil axes are each radially oriented. The stator can in particular be configured as a groove stator or can comprise a coil body or a coil carrier having grooves open toward the stator axis, with the coils each being wound onto a web formed between two grooves. The coil body can be manufactured from a ferromagnetic material, e.g. layered sheet iron or ferrite. The coils can have insulated wires for insulation against electrically conductive coil cores, for example in the form of the aforesaid webs. If the coils are flowed through by electric current, a directed magnetic field arises which acts directly on a permanent magnet and indirectly on a short-circuit.

The stator can alternatively, however, also comprise a plurality of coils arranged, in particular evenly distributed, in the peripheral direction and having tangentially oriented axes. The stator can comprise a ring core on which the coils are wound up. The coils are in particular each wound helically onto the ring core.

When a permanent magnet motor is used, the time control of the coils of the stator in particular takes place in dependence on the instantaneous rotary angle position of the permanent magnet rotor. Magnetic field sensors which detect the passage of a rotor pole through a stationary reference position can be provided for recognizing the position of the rotor. The voltage induced in the stator by the rotor can alternatively also be measured. No synchronization is required with a short-circuit ring. The stator field can there be operated at a high rotational speed to achieve a high eddy current and thus a large action of force.

The vapor feeder preferably has an insertion point for the rotor to which two mutually separate vapor feeder sections of the vapor feeder, in particular two vessel sections of an expansion vessel explained in more detail below, are connected to one another in a hermetically sealed and releasable manner. It is hereby made possible in a simple manner to insert the rotor into the vapor feeder or to remove the rotor from the vapor feeder. This is in particular advantageous on a cleaning or on a replacement of the rotor.

In accordance with an embodiment of the invention, a spacing is formed between the two vapor feeder sections which is bridged by an insertion piece which is in particular configured in ring shape or cylinder shape.

The two vapor feeder sections or the respective vapor feeder section and the insertion piece, in particular flanges of the two respective components, are preferably tensioned against one another, for example by means of a clamping ring or by means of screws. The connection between the two respective components can be formed with the interposition of a respective seal and/or as a flange connection, in particular as a vacuum flange connection, e.g. as a small flange connection (ISO-KF). The insertion piece can have a respective groove at the upper side and at the lower side into which groove the two vapor feeder sections engage. The insertion piece is preferably sealed with respect to the vapor feeder sections by means of a respective seal placed into the respective groove. The insertion piece can be manufactured, for example, from polytetrafluorethylene (PTFE) or from glass or from metal.

In accordance with an embodiment of the invention, the rotor is supported in a bearing of a support device for the rotor. The bearing can be configured as a friction bearing, as a roller bearing or as a magnetic bearing. The bearing can in particular comprise two bearings spaced apart from one another. The rotor can then be arranged between an upper bearing and a lower bearing. The rotor can, however, alternatively also be supported only at one side.

The support device can be supported at the inner walls of the vapor feeder. Supports for the support device can in particular be provided at the inner walls of the vapor feeder, in particular of each vapor feeder section. The supports can be provided at the inner walls, in particular evenly distributed in the peripheral direction. The supports can be fixedly fastened to the inner walls of the vapor feeder or can only be hung in there. The support device can alternatively be formed integrally with the aforesaid insertion piece. The number of mutually separate components can hereby be kept small.

The support device can comprise a plurality of webs, i.e. at least two webs, which extend radially and are arranged, in particular evenly distributed, in the peripheral direction of the vapor feeder. The webs can be extend outwardly in star shape from the rotor axis. It is ensured by the use of webs which are in particular comparatively narrow that the flow passage of the evaporated liquid through the vapor feeder is only insignificantly influenced by the support device. Alternatively or additionally, the support device can have a funnel section which is disposed upstream of the rotor and which tapers in the direction of flow of the vapor.

The mechanical foam breaker can be configured as a foam centrifuge or as a stirring member, in particular as a vane stirrer or as a paddle stirrer. With a foam centrifuge, centrifugal forces or inertia forces act on the foam so that it is hurled radially outwardly and is thereby broken up. A foam centrifuge can have at least one elongate hollow body, preferably a plurality of elongate hollow bodies, directed radially outwardly for the foam, in particular tubes or passages, which can each be inclined at an angle with regard to the direction of flow of the vapor. The foam is in this respect preferably previously concentrated at the center of the vapor feeder via the aforesaid funnel section. With a stirring member, the foam is mechanically broken up. A stirring member can have one or more rotor vanes.

The vapor feeder preferably has an expansion vessel and the rotor is arranged in the interior of the expansion vessel. As a rule, expansion vessels have a comparatively large diameter and thus offer sufficient space for the rotor.

A foam sensor for the detection of foam present in the vapor feeder is preferably arranged within the vapor feed. The sensor can, for example, be a capacitive sensor. If it is detected by the foam sensor that foam present in the vapor feeder exceeds a predefined measure, for example a predefined density or a predefined level in the vapor feeder, the rotor can automatically be set into rotation. As long as the foam has not yet reached the predefined measure, it is also not necessary to set the rotor into operation. It is generally also possible to manually trigger the setting into operation of the rotor.

Advantageous embodiments of the invention are also set forth in the dependent claims, in the further description and in the drawing.

Figure 3:
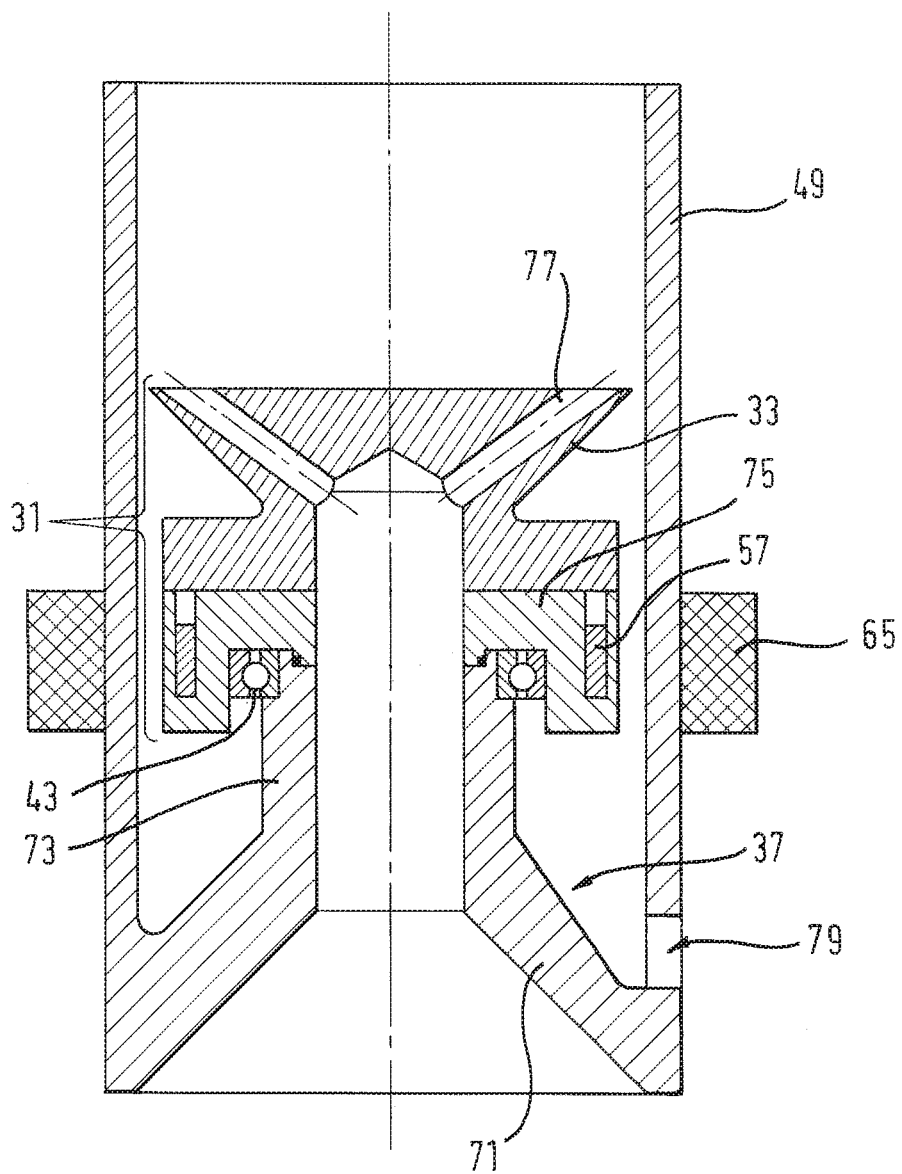

A non-restrictive embodiment of the invention is shown in the drawing and will be described in the following. There are shown, FIG. 1 a side view of a rotary evaporator having a vapor feeder with an expansion vessel;

FIG. 2 a schematic representation of a rotor in accordance with the invention in accordance with a first embodiment provided in the region of an expansion vessel;

FIG. 3 a rotor in accordance with the invention in accordance with a second embodiment; and FIG. 4 two mutually different variants of an electromagnetic drive for a rotor.

The rotary evaporator 11 shown in FIG. 1 comprises a rotary drive 13 for an evaporator flask 15 which is configured as a round-bottomed flask or the like and which can be heated in a heating bath 17 to evaporate a distillate from a liquid mixture contained therein. The evaporated distillate then moves via a vapor conduit 19 led through the rotary drive 13 into a cooler 21 to condense there. The condensed distillate is then collected in a collector flask, not shown.

A vacuum connection 23 is provided at the cooler 21 to apply a vacuum generated by a vacuum pump at the cooler 21 and at the evaporator flask 15, whereby the boiling temperature for the distillate can be lowered. The rotary evaporator 11 can additionally comprises a lift which carries the rotary drive 13 and which can move it in the vertical direction to lower the evaporator flask 15 into the heating bath 17 or to lift it out of it. It is equally possible that instead of the rotary drive 13 the heating bath 17 is movable in the vertical direction by means of a lift. The rotary evaporator 11 furthermore comprises a control unit 25 for controlling the heating bath 17, the rotary drive 13, the vacuum pump, and the lift.

An expansion vessel 27 is arranged downstream of the evaporator flask 15 and upstream of the cooler 21, i.e. the vapor rising from the evaporator flask 15 first runs through the expansion vessel 27 before it condenses in the cooler 21. The advantage is hereby achieved with respect to an arrangement in which the expansion vessel 27 is omitted that, with a foaming liquid mixture, the foam does not immediately move into the cooler and from there directly into the collector flask, but the foam can father first propagate into the expansion vessel 27. The expansion vessel 27 is part of a vapor feeder 29. The cooler 21 is in fluid communication with the evaporator flask 15 via the vapor feeder 29.

To prevent the foam from continuing to rise, so that the volume of the expansion vessel 27 would also no longer be sufficient to keep the foam out of the cooler 21, a rotor 31 is provided in the region of the expansion vessel 27 (cf. FIGS. 2 and 3) and the foam can be mechanically broken up by it and can thus be kept within the expansion vessel 27.

Figure 2A:
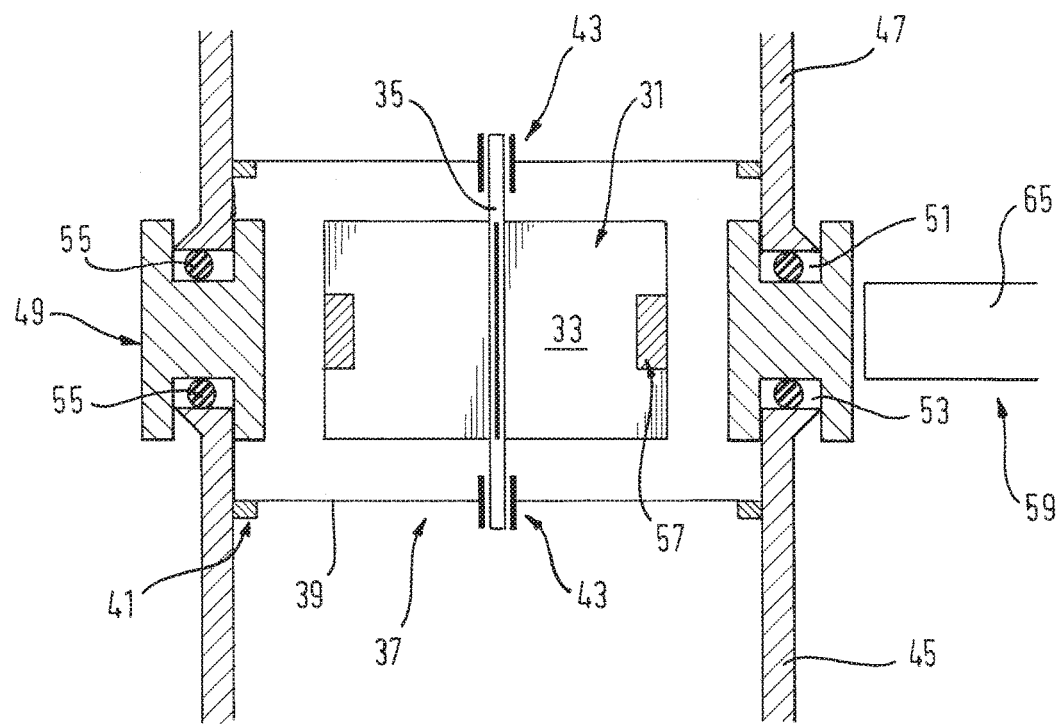
Figure 2B:
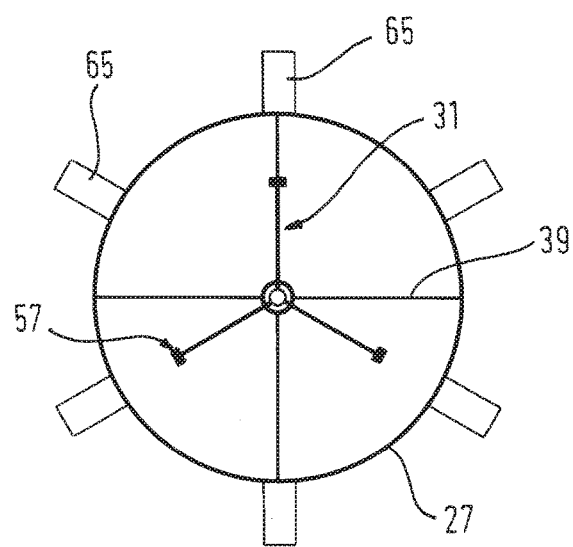

As can be seen from a very schematic longitudinal section or transverse section through an expansion vessel 27 in accordance with FIGS. 2a and 2b, the rotor 31 arranged within the expansion vessel 27 has, in accordance with an embodiment of the invention, a foam breaker 33 in the form of a vane stirrer having a plurality of rotor vanes which each extend radially outwardly from a common central shaft 35. The foam located in the expansion vessel 27 can be mechanically broken up by rotation of the rotor vanes 33.

The rotor vanes 33 or the shaft 35 are slidingly supported rotatably in a support device 37 for the rotor 31. The support device 37 for this purpose has two support planes which are arranged above one another and which each comprise a plurality of webs 39 arranged in star shape. The webs 39 are held at the expansion vessel 27 via supports 41 provided at the inner wall of the expansion vessel 27. The respective center of the star-shaped web arrangements forms a respective bearing 43 for the rotor 31. The rotor 31 is arranged between the two support planes in this respect. Four webs 39 are provided per support plane in FIG. 2. More or fewer than four webs 39 can, however, also be provided, for example only two webs 39.

To be able to remove the rotor 31 simply from the expansion vessel 27 for cleaning or the like, the expansion vessel 27 is formed in two parts, i.e. the expansion vessel 27 has a lower vessel section 45 and an upper vessel section 47. The expansion vessel 27 can therefore be taken apart easily and the rotor 31 can simply be inserted into or removed from the expansion vessel 27.

To close the connection point between the two vessel sections 45, 47 arranged spaced apart from one another or to close the insertion point for the rotor 31 in a vacuum tight and releasable manner, an insertion piece 49 in the form of an intermediate formed in H shape in cross-section is provided which has an upwardly open peripheral groove 51 and a downwardly open peripheral groove 53 into which the respective one sealing ring 55 is placed. The lower end of the upper vessel section 47 or the upper end of the lower vessel section 45 then engage into the two grooves 51, 53. The two vessel sections 45, 47 are tensioned with respect to one another via a clamping device, not shown.

The rotor 31 is electromagnetically driven. For this purpose, the rotor 31 has a magnetic entrainer in the form of permanent magnets 57 which are attached to the rotor vanes 33 in the present example and which are driven contactlessly by a stator 59 arranged outside of the expansion vessel 27. The stator 59 for this purpose comprises a plurality of coils 65 which are arranged distributed in the peripheral direction and which are controlled such that a magnetic rotary field is generated which the rotor 31 follows.

A further embodiment of a rotor 31 in accordance with the invention is shown in FIG. 3. For reasons of clarity, the same reference numerals are used as in the embodiment in accordance with FIGS. 2a and 2b for components which are the same or functionally similar, with primarily the differences from the embodiment in accordance with FIGS. 2a and 2b being explained with respect to the further embodiment in accordance with FIG. 3.

In the embodiment in accordance with FIG. 3, the support device 37 comprises a funnel section 71 which tapers in the direction of flow of the vapor and which is formed in one piece with the insertion piece 49. The funnel section 71 merges into a hollow-cylindrical intermediate section 73 of the support device 37 on which intermediate section the rotor 31 is supported via a bearing 43. The rotor 31 comprises a rotor carrier 75 and a foam breaker 33 in the form of a foam centrifuge fixedly connected to the rotor carrier 75 via screws. The permanent magnets 57 which cooperate with the coils 65 generating the outer magnetic field are arranged in the rotor carrier 75. Bores 77 are formed in the foam centrifuge 33 which are arranged evenly distributed in the peripheral direction, which are in fluid communication with the hollow space of the intermediate section 73 and which each extend radially outwardly inclined at an angle with respect to the direction of flow of the vapor.

In operation, foam rising up in the vapor feeder 29 is conducted through the funnel section 71 into the hollow space of the intermediate section 73 arranged centrally in the vapor feeder 29 and is hurled from there radially outwardly through the bores 77 formed in the rotating rotor 31 against the inner wall of the insertion piece 49 and is thereby broken up. The liquefied foam then runs down the inner wall of the insertion piece 49 under the effect of gravity and can be removed from the vapor feeder 29 via at least one outflow 79 which is connected to a hose, not shown. Additionally or alternatively, at least one opening can be formed in the funnel section 71 so that the liquefied foam can run back into the evaporator flask 15.

Figure 4A:
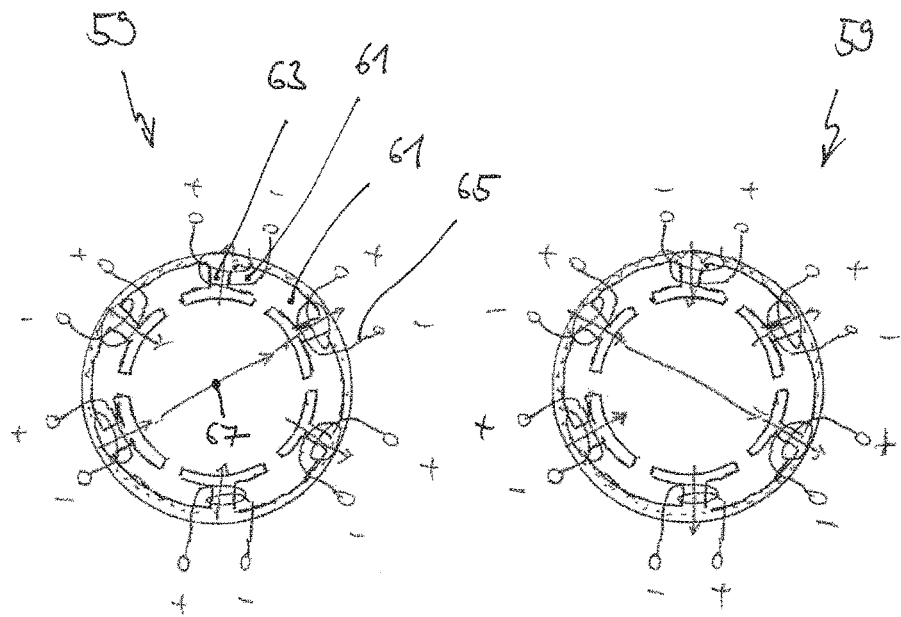

A groove stator 59 is shown in FIG. 4a. Coils 65 are inserted into the grooves 61 of a coil body 63 of the groove stator 59 arranged evenly distributed in the peripheral direction so that the coil axes extend radially to the stator axis 67. The stator 59 comprises six identical coils 65. The stator 59 can, however, generally also have any other desired number of coils 65. In the embodiment shown, a respective three coils 65 arranged next to one another are operated in the same direction of flow, i.e. a respective three coils 65 disposed next to one another have the same magnetic orientation in the radial direction. In sum, the stator 59 thus has a positive magnetic pole extending over a semi-circle and a negative magnetic pole extending over a semi-circle. The magnetic entrainer in FIG. 4a comprises a single permanent magnet 57 which is oriented in a known manner in the outer bipolar magnetic field of the stator 59, in particular faces the respective centrally arranged coil 65 of the respective three coils 65 operated in the same direction of flow. Instead of the permanent magnet 57, a short-circuit ring can also be used. To generate an outer magnetic field rotating clockwise or counter-clockwise, the coils 65 are controlled such that the separation plane between the semi-circular positive magnetic pole and the semi-circular negative magnetic pole of the stator 59 migrates step-wise clockwise or counter-clockwise.

Figure 4B:
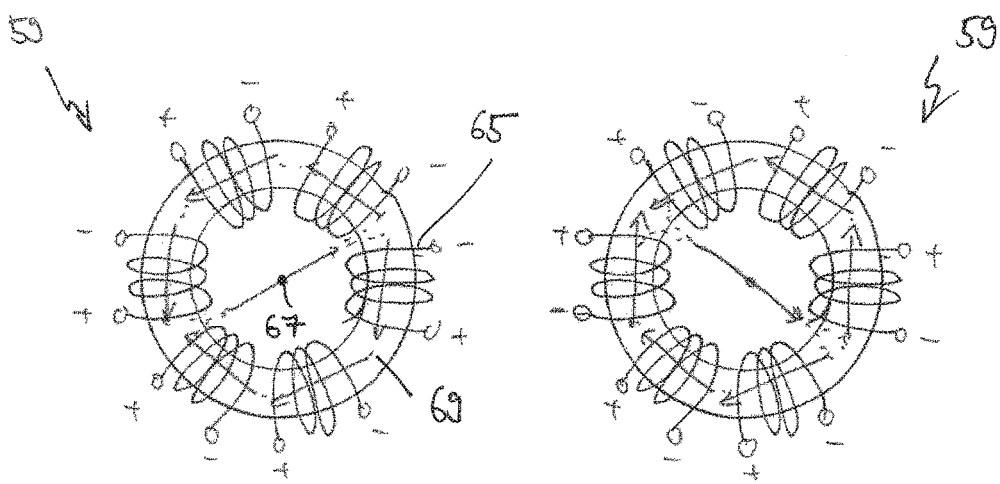

The coils 65 of the stator 59 can, however, also be arranged such that the coil axes each extend tangentially to the stator axis 67, as is shown in FIG. 4b. For this purpose, the stator 59 comprises a common ring core 69 onto which the coils 65 are wound. The coils 65 are arranged evenly distributed in the peripheral direction, with in turn a respective three coils 65 having current supplied to them in the same direction. The stator 59 then forms two semi-circular electromagnets which are disposed in parallel with one another, whereby overall a bipolar stator 59 in the sense of the present invention is formed. A field displacement occurs at the two points at which like poles meet one another. The field lines exit the ring 69 radially and exert a force on the inwardly disposed rotor 31. The direction of the magnetic field is also varied here such that a rotating magnetic field is formed overall by an alternate current application to the coils.

A foam sensor is provided above this which is not shown in the Figures and which can generally be arranged at the same level as or beneath or above the rotor 31 in the expansion vessel 27. For example, the presence of foam per se can be detected by a foam sensor arranged above the rotor 31 and the rotor 31 can automatically be set into operation independently of the foam density in response to a corresponding signal of the foam sensor. With a foam sensor arranged beneath the rotor 31, the density of the foam can, for example, be detected and the rotor 31 only set into operation on an exceeding of a specific limit value.

A foaming of the liquid to be evaporated over into the cooler can be effectively avoided in a rotary evaporator by the rotor in accordance with the invention.

REFERENCE NUMERAL LIST 11 rotary evaporator
13 rotary drive
15 evaporator flask
17 heating bath
19 vapor passage
21 cooler
23 vacuum connection
25 operating unit
27 expansion vessel
29 vapor feeder
31 rotor
33 foam breaker
35 shaft
37 support device
39 web
41 support
43 bearing
45, 47 vessel section
49 insertion piece
51, 53 groove
55 seal ring
57 permanent magnet
59 stator
61 groove
63 coil body
65 coil
67 stator axis
69 ring core
71 funnel section
73 intermediate section
75 rotor carrier
77 bore
79 outflow

The invention claimed is:

1. A rotary evaporator for the vacuum distillation of a liquid comprising an evaporator flask, a vapor feeder connected downstream of the evaporator flask and having an interior volume, a rotor having a mechanical foam breaker being disposed in the interior volume of the vapor feeder, and a cooler connected downstream of the vapor feeder.

2. The rotary evaporator in accordance with claim 1, wherein the rotor is contactlessly driven by a drive device arranged outside of the vapor feeder or by a battery formed integrally with the rotor.

3. The rotary evaporator in accordance with claim 1, wherein a drive of the rotor takes place electromagnetically by means of a stator which is arranged outside of the vapor feeder.

4. The rotary evaporator in accordance with claim 3, wherein the stator comprises a plurality of coils which are arranged around a circumference of a coil body and which are controlled such that a magnetic rotary field is generated and/or such that the stator has a plurality of magnetic poles arranged in the peripheral direction.

5. The rotary evaporator in accordance with claim 1, wherein the rotor comprises an even number of permanent magnet poles arranged around a circumference of a coil body or a short-circuit ring.

6. The rotary evaporator in accordance with claims 3, wherein the stator comprises a plurality of coils arranged around a circumference of a coil body and having radially or tangentially oriented axes.

7. The rotary evaporator in accordance with claim 1, wherein the vapor feeder has an insertion point for the rotor at which two mutually separate vapor feeder sections of the vapor feeder are connected to one another in a hermetically sealed and releasable manner.

8. The rotary evaporator in accordance with claim 7, wherein a spacing is formed between the two vapor feeder sections, with the spacing being bridged by an insertion piece.

9. The rotary evaporator in accordance with claim 1, further comprising a support device having a bearing for the rotor.

10. The rotary evaporator in accordance with claim 9, wherein the support device is supported at inner walls of the vapor feeder or is formed integrally with an insertion piece.

11. The rotary evaporator in accordance with claim 9, wherein the support device comprises a plurality of webs extending radially and arranged around a circumference of a coil body of the vapor feeder or comprises a funnel section connected upstream of the rotor and tapering in the direction of flow of the vapor.

12. The rotary evaporator in accordance with claim 1, wherein the mechanical foam breaker is configured as a foam centrifuge or as a stirring member.

13. The rotary evaporator in accordance with claim 1, wherein the vapor feeder has an expansion vessel and the rotor is arranged in the interior of the expansion vessel.

14. The rotary evaporator in accordance with claim 1, further comprising a foam sensor arranged within the vapor feeder for the detection of foam present in the vapor feeder.

15. The rotary evaporator in accordance with claim 14, wherein the rotary evaporator is configured to set the rotor into rotation automatically when it is detected by the foam sensor that foam present in the vapor feeder exceeds a predefined measure.

* * * * *